BEST AVAILABLE COPY
BEST AVAILABLE COPY
J. B. ARCI.
HAMMOCK-FRAMES.
No. 7,393.
Reissued Nov. 14, 1876.
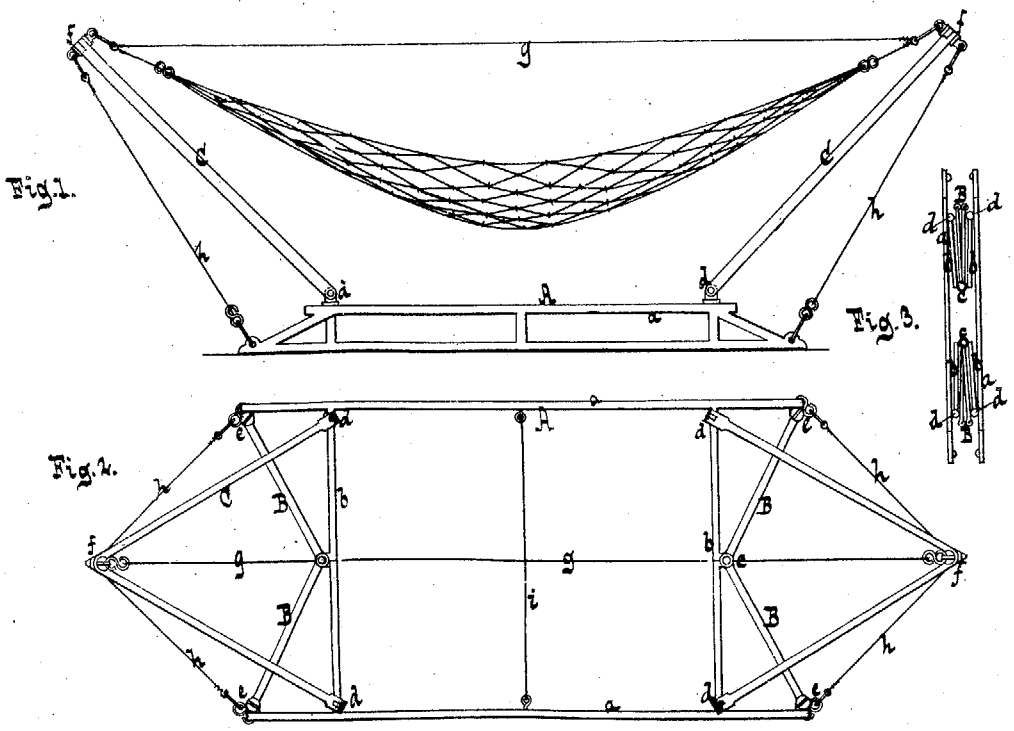
Witnesses.
Otto Hufeland
Robt. E. Miller
Inventor.
Juan B. Arci
by
Van Santvoord & Huff
his attorneys

UNITED STATES PATENT OFFICE.

JUAN B. ARCI, OF BROOKLYN, NEW YORK.

IMPROVEMENT IN HAMMOCK-FRAMES.

Specification forming part of Letters Patent No. 182,049, dated September 12, 1876; reissue No. 7,393, dated November 14, 1876; application filed October 11, 1876.

*To all whom it may concern:*

Be it known that I, JUAN B. ARCI, of Brooklyn, in the county of Kings and State of New York, have invented a new and useful Improvement in Hammock-Frames, which improvement is fully set forth in the following specification, reference being had to the accompanying drawing, in which—

Figure 1 represents a side view of my frame when unfolded. Fig. 2 is a plan or top view of the same. Fig. 3 is a side view of the same when folded, on a smaller scale than the previous figures.

Similar letters indicate corresponding parts.

This invention relates to certain improvements in hammock-frames; and consists in constructing the frame of rigid side rails, hinged end rails, hinged braces, and folding struts, the arrangement of which will be fully hereinafter described.

The invention also consists in combining, with the before-mentioned parts, guy-ropes and a stop-rope, as will more fully hereinafter appear.

In the drawing, the letter A designates a frame, which forms the support or foot of my device. With this frame are combined two pairs of struts, C, which are connected to the frame A at its opposite ends by means of hinge-joints *d*, and each pair of which, when unfolded for use, is united on its outer ends by pivots *f*. A rope, *g*, forms a common stop for both pairs of struts, to prevent them from unfolding beyond the required point.

When the device is not to be used, the pivots *f* are withdrawn, and the struts C are folded in over the frame A; and when the device is to be used the struts C are turned out, the pivots *f* are inserted, and the hammock is slung.

This operation can be performed by one person, whereas, if the struts are entirely disconnected from the supporting-frame, it requires two persons to bring the same in the required position for slinging the hammock.

The frame A is constructed of rigid side rails *a* and sectional end rails *b*, the sections of which are connected to each other by pivots *c*, and to the side rails by pivots *d*, the heads of which form the bearings for the struts C, as above stated. From the central pivots of the end rails extend braces B, which are connected to extensions of the side rails by pivots *e*.

By this arrangement the whole device, when it is not used, can be folded up to the position shown in Fig. 3; but if the same is to be used, the frame A is unfolded to the position shown in Fig. 2. The struts C are turned up, being prevented from being unfolded beyond the desired position by the stop-rope *g*, and they are further secured in position by guy-ropes *h*, which extend from their upper ends to the ends of the extensions of the side rails *a*. The side rails are braced by transverse ropes *i*, one or more, to prevent them from spreading outward, and the hammock D is finally slung to the pivots which unite the upper ends of the struts.

By this arrangement a frame is obtained which can be readily folded and unfolded, and which, when unfolded, can be readily put up in any convenient place for the support of a hammock. The stop-rope *g* also serves to facilitate the operation of getting in and out of the hammock.

When the frame is to be folded up, the ropes *h* have to be unhooked, and the pivots *e* at the outer ends of the braces B have to be withdrawn. These pivots are made with small hooks at their lower ends, so that they do not drop out accidentally.

What I claim as new, and desire to secure by Letters Patent, is—

1. A hammock-frame composed of rigid side rails *a*, sectional hinged end rails *b*, hinged braces B, and folding struts C, all constructed and operating substantially as described.

2. The combination, with the rigid side rails *a*, sectional end rails *b*, hinged braces B, and folding struts C, of guy-ropes *h*, and a stop-rope, *g*, all arranged substantially as and for the purpose set forth.

In testimony that I claim the foregoing I have hereunto set my hand and seal this 3d day of October, 1876.

JUAN B. ARCI. [L. S.]

Witnesses:

W. HAUFF,

E. F. KASTENHUBER.